United States Patent
Mueller et al.

(10) Patent No.: US 11,764,995 B2
(45) Date of Patent: Sep. 19, 2023

(54) TRANSCEIVER DEVICE

(71) Applicant: NXP B.V., Eindhoven (NL)

(72) Inventors: Steffen Mueller, Hamburg (DE); Lucas Pieter Lodewijk van Dijk, Kranenburg (DE); Georg Olma, Grasbrunn (NL); Joachim Josef Maria Kruecken, Munich (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/805,122

(22) Filed: Jun. 2, 2022

(65) Prior Publication Data
US 2022/0393904 A1 Dec. 8, 2022

(30) Foreign Application Priority Data

Jun. 3, 2021 (EP) .................................. 21177602

(51) Int. Cl.
*H04L 12/40* (2006.01)
*H04B 1/401* (2015.01)
*H04B 3/46* (2015.01)

(52) U.S. Cl.
CPC ............. *H04L 12/40* (2013.01); *H04B 1/401* (2013.01); *H04B 3/46* (2013.01); *H04L 2012/40215* (2013.01); *H04L 2012/40273* (2013.01)

(58) Field of Classification Search
CPC . H04L 12/40; H04L 2012/40215; H04B 3/46; H04B 1/401; H04B 1/44
See application file for complete search history.

(56) References Cited

U.S. PATENT DOCUMENTS

| | | | |
|---|---|---|---|
| 6,439,462 B1 | 8/2002 | Dickson et al. | |
| 8,625,295 B2* | 1/2014 | Alley | G06F 13/385 710/305 |
| 8,750,351 B2* | 6/2014 | Muth | H04L 12/12 375/219 |
| 9,112,721 B2 | 8/2015 | Behrens et al. | |
| 10,009,289 B2* | 6/2018 | Maise | H04L 12/40 |
| 10,284,388 B2 | 5/2019 | Kishigami et al. | |

(Continued)

FOREIGN PATENT DOCUMENTS

| DE | 102005037723 A1 | 2/2007 |
|---|---|---|
| EP | 3373526 A1 | 12/2018 |
| WO | 2018/104929 A1 | 6/2018 |

OTHER PUBLICATIONS

U.S. Appl. No. 17/660,393, filed Apr. 22, 2022, not yet published, 83 pages.

(Continued)

*Primary Examiner* — Khanh C Tran

(57) ABSTRACT

The disclosure relates to a transceiver device, an electronic control unit and an associated method. The transceiver device is suitable for communicating between one or more network protocol controllers and a network bus and comprises: first interface circuitry configured to communicate with the one or more network protocol controllers; second interface circuitry configured to communicate with the one or more network protocol controllers; and selector circuitry configured to switch communication with the one or more network protocol controllers from the first interface circuitry to the second interface circuitry in response to a communication error in data carried on the first interface circuitry.

20 Claims, 8 Drawing Sheets

(56) References Cited

U.S. PATENT DOCUMENTS

| | | | |
|---|---|---|---|
| 10,445,107 B2 | 10/2019 | Sun et al. | |
| 10,454,705 B2 | 10/2019 | Hartwich et al. | |
| 10,785,066 B1 | 9/2020 | van Dijk | |
| 10,791,002 B2 | 9/2020 | de Haas et al. | |
| 10,826,719 B2 | 11/2020 | Muth et al. | |
| 10,838,906 B1 | 11/2020 | van Dijk | |
| 11,038,508 B2 | 6/2021 | de Haas et al. | |
| 11,061,844 B2 | 7/2021 | de Haas et al. | |
| 11,368,330 B2* | 6/2022 | de Haas | H04L 12/40169 |
| 2001/0009553 A1* | 7/2001 | Homann | H04L 49/351 370/445 |
| 2004/0119517 A1 | 6/2004 | Pauletti et al. | |
| 2012/0051241 A1 | 3/2012 | Mori et al. | |
| 2012/0297105 A1 | 11/2012 | Elend | |
| 2014/0350772 A1 | 11/2014 | Saito | |
| 2014/0365693 A1* | 12/2014 | Monroe | G06F 3/00 710/105 |
| 2017/0048085 A1* | 2/2017 | Munoz | H04L 5/0007 |
| 2017/0168976 A1* | 6/2017 | Yost | G06F 13/4282 |
| 2018/0041358 A1* | 2/2018 | Kishigami | H04L 12/40 |
| 2018/0198481 A1 | 7/2018 | Bavois | |
| 2018/0205572 A1 | 7/2018 | Kishigami et al. | |
| 2018/0215347 A1* | 8/2018 | Weghaus | B60R 25/245 |
| 2018/0227145 A1 | 8/2018 | Brochi et al. | |
| 2018/0309590 A1 | 10/2018 | Beckmann et al. | |
| 2019/0017311 A1 | 1/2019 | McGettrick et al. | |
| 2019/0215233 A1 | 7/2019 | Huang et al. | |
| 2019/0385057 A1* | 12/2019 | Litichever | H04L 63/14 |
| 2020/0117632 A1* | 4/2020 | Mutter | G06F 13/409 |
| 2020/0213351 A1 | 7/2020 | Shin et al. | |
| 2020/0262544 A1* | 8/2020 | Wilkens | G05D 1/0077 |
| 2020/0267018 A1 | 8/2020 | Gupta et al. | |
| 2020/0382340 A1 | 12/2020 | Muth | |
| 2020/0403823 A1 | 12/2020 | van Dijk | |
| 2020/0412583 A1 | 12/2020 | Walker et al. | |
| 2021/0120017 A1 | 4/2021 | Antonsson | |
| 2021/0224079 A1 | 7/2021 | Muth | |
| 2021/0250199 A1* | 8/2021 | Evers | B60R 16/02 |

OTHER PUBLICATIONS

"AU5790 Single wire CAN transceiver", Integrated Circuits Data sheet, Philips Semiconductors, 20 pgs, (May 18, 2001).
NXP; "UJA1166a High-speed CAN transceiver with 5 V LDO and Sleep mode, Revision 1"; Data Sheet; 35 pages (Aug. 23, 2019).
ISO; "International Standard ISO 11898-2-2016, Road vehicles—Controller area network (CAN)—Part 2: High-speed medium access unit"; 38 pgs. (Dec. 15, 2016).
ISO; "International Standard ISO 11898-3, Road vehicles—Controller area network (CAN)—Part 3: Low-speed, fault-tolerant, medium-dependent interface"; 32 pgs. (Jun. 1, 2006).
Infineon; "TLE9250X Z8F57889425, rev. 1.4"; retreived from the internet at: https://www.infineon.com/dgdl/Infineon-Z8F57889425_TLE9250X-ApplicationNotes-v01_40-EN.pdf?fileId=5546d4625debb399015e14d43ba35991; 17 pages (Jul. 27, 2020).
NXP; "TJA1055 Enhanced fault-tolerant CAN transceiver, Rev. 5"; Product data sheet; 26 pages (Dec. 6, 2013).
International Organization for Standardization; Draft International Standard ISO 11898-3 .2—Road vehicles—Controller area network (CAN)—Part 3: Low-speed, fault-tolerant, medium dependent interface; 30 pages (2005).
CAN in Automation (CiA) e.V.; "Draft Specification Proposal CiA 601-4, Version 2.1.0, CAN FD node and system design, Part 4: Signal Improvement"; 20 pages (Oct. 7, 2021).
Non Final Office Action; U.S. Appl. No. 17/248,224; 20 pages dated Mar. 1, 2022).
U.S. Appl. No. 17/249,674; 20 pages, filed Mar. 9, 2021.
Non Final Office Action; U.S. Appl. No. 17/249,674; 16 pages (dated Mar. 9, 2021).
U.S. Appl. No. 17/804,936; 30 pages, filed Jun. 1, 2022.
Notice of Allowance; U.S. Appl. No. 17/284,224; 9 pages (dated Sep. 22, 2022).
Liebetrau, Thomas et al.; "Energy Saving in Automotive E/E Architectures Contents"; retrieved from the Internet: https://www.eletrimes.com/wp-content/uploads/2017/02/Infineon-Energy_Saving_in_Automotive_EE_Architectures.pdf; 21 pages (Dec. 31, 2012).
Schuermans, P.; "Sicheres Serielles Bus-Konzept Auf Der Basis Des Can-Bus"; Signal Und Draht: Signalling & Datacommunication, Euralipress, DE, vol. 83, No. 10; pp. 248-252 (Oct. 1, 1991) With English Machine Translation.

* cited by examiner

TRANSCEIVER DEVICE

CROSS-REFERENCE TO RELATED APPLICATIONS

This application claims the priority under 35 U.S.C. § 119 of European patent application no. 21177602.6, filed Jun. 3, 2021 the contents of which are incorporated by reference herein.

FIELD

The present disclosure relates to at least one of a transceiver device and an electronic control unit, ECU, and to at least one of a method for operating a transceiver device and an ECU, and in particular, although not exclusively, relates to Controller Area Network (CAN) devices.

BACKGROUND

In-vehicle network (IVN) busses, such as CAN (Controller Area Network), CAN FD (CAN with Flexible Data-Rate), LIN (Local Interconnect Network), FlexRay, Ethernet based network busses, and other types, can be used for communications within vehicles. For example, controller area network (CAN) bus is a message-based communications bus protocol that is often used within automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-2:2016 standard, can provide higher data rates. But the standardized CAN data link layer protocol is still in further process of being extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard. However, it is of interest to allow backwards compatibility and availability between all the CAN flavours, for example, CAN XL with CAN FD.

FIG. 1a shows a Controller Area Network (CAN) bus network 100 comprising multiple nodes, or devices 102a-e and a twisted pair cable providing a CAN bus 104 for communicating a differential signal between the multiple CAN nodes 102a-2 via stubs (e.g., stubs 106a-c). There are termination resistors 108a,b at the end nodes (node 1 and 2) 102a, 102b, as an example is shown in FIG. 1a.

FIG. 1b shows a schematic block diagram of a CAN node, or device, 102 coupled to the CAN bus, 104 of FIG. 1a. The CAN node 102 comprises a CAN controller 110 and a CAN transceiver 112. The CAN controller 110 may be implemented by a processor, such as a microprocessor, configured to implement a CAN protocol of operation within the CAN bus network 100. The CAN transceiver 112 interfaces the CAN controller 110 with the CAN bus 104. In one or more examples, the CAN transceiver 112 can operate with no, or limited, circuitry for understanding or implementing the CAN protocol and so may be of relatively limited power consumption compared to the processor of the CAN controller 110.

The CAN controller 110 has a transmit output 116 and a receive input, 118. The CAN transceiver 112 has a transmit input 120, a receive output 122 and a bus terminal 124, which may also be referred to as a bus port. The bus terminal 124 may comprise a bus terminal resistor ($R_{BUS}$) 125. The bus terminal 124 is coupled to the two signal lines of the CAN bus 104. The transmitter output 116 of the CAN controller 110 is coupled to the transmit input 120 of the CAN transceiver 112. The receive input 118 of the CAN controller 110 is coupled to the receive output 122 of the CAN transceiver 112.

The CAN transceiver 112 comprises a transmitter 111 and a receiver 114. The transmitter 111 has an input coupled to the transmit input 120 of the CAN transceiver 110 and outputs connected to the CAN bus terminal 124 of the CAN transceiver 112. The transmitter 111 is configured to convert data received at the transmit input 120 of the CAN transceiver 112 to a differential signal for the CAN bus 104 via the bus terminal 124.

The receiver 114 has inputs coupled to the CAN bus terminal 124 and an output coupled to the receiver output 122 of the CAN transceiver 112. The receiver 114 is configured to convert a differential voltage signal on the CAN bus 104 into data for the CAN controller 110. The general architecture of the CAN node shown in FIG. 1b applies equally to all flavours of CAN, including CAN FD for example.

The present disclosure relates to providing a transceiver device with improved safety for use in next generation autonomous vehicles.

SUMMARY

According to a first aspect of the present disclosure there is provided a transceiver device for communicating between one or more network protocol controllers and a network bus, the transceiver device comprising: first interface circuitry configured to communicate with the one or more network protocol controllers; second interface circuitry configured to communicate with the one or more network protocol controllers; and selector circuitry configured to switch communication with the one or more network protocol controllers from the first interface circuitry to the second interface circuitry in response to a communication error in data carried on the first interface circuitry.

In one or more embodiments the transceiver device further comprises monitoring circuitry configured to: monitor communication information with the one or more network protocol controllers over the first interface circuitry; and generate the indication of the communication error in data carried on the first interface circuitry based on the monitored communication information.

In one or more embodiments generating the indication of the communication error in data carried on the first interface circuitry based on the monitored communication information comprises: recording at least one performance parameter representative of the monitored communication information; comparing the at least one performance parameter with one or more communication error entries stored in a look-up table; and generating the indication of the communication error in data carried on the first interface circuitry if the at least one performance parameter matches at least one of the one or more communication error entries stored in the look-up table.

In one or more embodiments the monitoring circuitry is configured to: record at least one performance parameter representative of the monitored communication information; and further comprising diagnostics circuitry configured to: receive the at least one performance parameter from the monitoring circuitry, compare the at least one performance parameter with one or more communication error entries stored in a look-up table, and generate the indication of the communication error in data carried on the first interface circuitry if the at least one performance parameter matches at least one of the one or more communication error entries stored in the look-up table.

In one or more embodiments generating the indication of the communication error in data carried on the first interface circuitry based on the monitored communication information further comprises: recording at least one further performance parameter representative of the monitored communication information; determining a pattern in the recorded performance parameters; and generating the indication of the communication error in data carried on the first interface circuitry if the pattern in the recorded performance parameters matches at least one corresponding pattern in the one or more communication error entries stored in the look-up table.

In one or more embodiments the transceiver device further comprises third interface circuitry, wherein the selector circuitry is configured to transmit a switch message to the one or more network protocol controllers via the third interface circuitry upon switching communication with the one or more network protocol controllers from the first interface circuitry to the second interface circuitry.

In one or more embodiments the switch message comprises information regarding the indication of the communication error in data carried on the first interface circuitry.

In one or more embodiments the third interface circuitry is configured to allow bi-directional communication between the selector circuitry and the one or more network protocol controllers. The third interface circuitry may comprise a separate communication link for each of the one or more network protocol controllers.

In one or more embodiments the communication error in data carried on the first interface circuitry may be an error at the physical layer level, rather than an error at the communications protocol level. The communication error in data carried on the first interface circuitry may correspond to one or more of: an open circuit; a short circuit; an electromagnetic compatibility, (EMC) disturbance; or failure of the first interface circuitry. The open circuit and short circuit may be one or more of on the network bus and between the transceiver device and the network bus. The short circuit may be with respect to ground or to a supply for the network bus.

In one or more embodiments the selector circuitry is further configured to: receive an indication that the communication error in data carried on the first interface circuitry has been resolved; receive an indication of a communication error in data carried on the second interface circuitry; and switch communication with the one or more network protocol controllers from the second interface circuitry to the first interface circuitry in response to the received indication of the communication error in data carried on the second interface circuitry.

In one or more embodiments the monitoring circuitry is configured to determine that the communication error in data carried on the first interface circuitry has been resolved. The monitoring circuitry may be configured to determine the indication of the communication error in data carried on the second interface circuitry.

In one or more embodiments the first interface circuitry and the second interface circuitry comprise digital circuitry for communicating with the one or more network protocol controllers.

In one or more embodiments the transceiver device comprises transceiver circuitry coupled to the first and second interface circuitry, wherein the transceiver circuitry is configured to communicate over the network bus.

In one or more embodiments the network bus is a single-ended signaling bus or a differential signaling bus. The differential signaling bus may be a FlexRay bus. The single ended signaling bus may be a local interconnect network, LIN, bus.

In one or more embodiments the transceiver device is a controller area network, CAN, transceiver device, the one or more network protocol controllers are CAN controllers, and the network bus is a CAN bus. The CAN transceiver, one or more CAN network protocol controllers and the CAN bus may operate according to the CAN FD protocol, High-Speed CAN, or CAN XL.

In one or more embodiments the transceiver device comprises a first power supply for the first interface circuitry and a second power supply for the first interface circuitry.

According to a second aspect of the present disclosure there is provided an electronic control unit, ECU, comprising: the transceiver device of the first aspect; and one or more network protocol controllers, wherein each of the one or more network protocol controllers comprises: first controller interface circuitry coupled to the first interface circuitry of the transceiver device, and second controller interface circuitry coupled to the second interface circuitry of the transceiver device.

In one or more embodiments of the second aspect the selector circuitry is configured to: receive an indication of a communication error in data carried on the first controller interface circuitry on at least one of the one or more network protocol controllers; and switch communication between the transceiver device and the at least one of the one or more network protocol controllers from the first interface circuitry to the second interface circuitry in response to the determined communication error in data carried on the first controller interface circuitry on the at least one of the one or more network protocol controllers.

In one or more embodiments of the second aspect each of the one or more network protocol controllers comprises: a first microcontroller coupled to the first and second controller interface circuitry; or a first microcontroller coupled to the first controller interface circuitry, and a second microcontroller coupled to the second controller interface circuitry.

According to a further aspect of the present disclosure there is provided a method of operating the transceiver device of the first aspect, the method comprising: receiving an indication of a communication error in data carried on the first interface circuitry, and switching communication between the transceiver device and the one or more network protocol controllers from the first interface circuitry to the second interface circuitry based on the received indication of the communication error in data carried on the first interface circuitry.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings.

FIG. 1b shows an example schematic block diagram of a node on the CAN bus network of FIG. 1a.

DETAILED DESCRIPTION

When approaching autonomous driving (AD) level 3 (see, e.g., SAE standard J3016) and beyond, there is a need to develop and implement extended means of functional safety in order to comply with more stringent functional safety requirements and goals.

In an AD vehicle system, sensors, actuators, communication elements and lines, computational elements, and decision-making instances may be combined. A standardized way to describe means of functional safety and its requirements for vehicle systems or sub-systems uses the Automotive Safety Integrity Level, ASIL, classes introduced in ISO 26262.

For compliance with AD level 3 and beyond, the communication system in a vehicle should meet the extended requirements of an "ASIL-rated" system rather than being "quality managed". To meet the extended requirements of an "ASIL-rated" system, the communication system or its sub-systems should provide additional functionality of monitoring, controlling, and communicating to a higher hierarchical level within the architecture of the vehicle system.

Figure 1A:
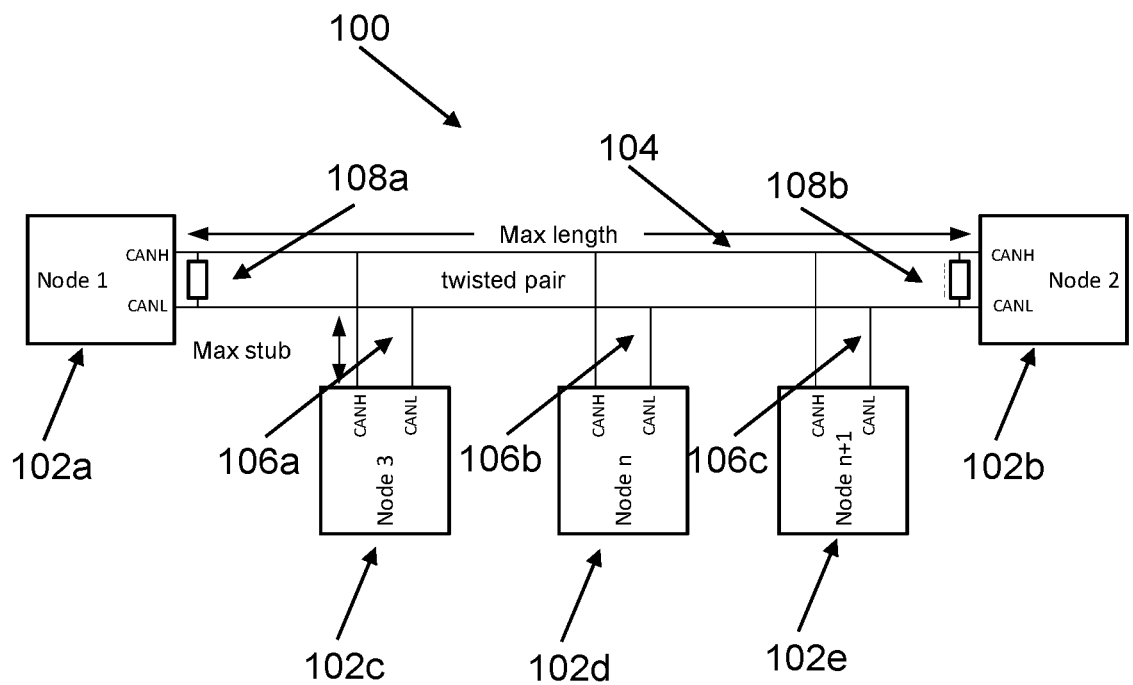
FIG. 1a shows an example schematic block diagram of a controller area network (CAN) bus network.
Figure 1B:
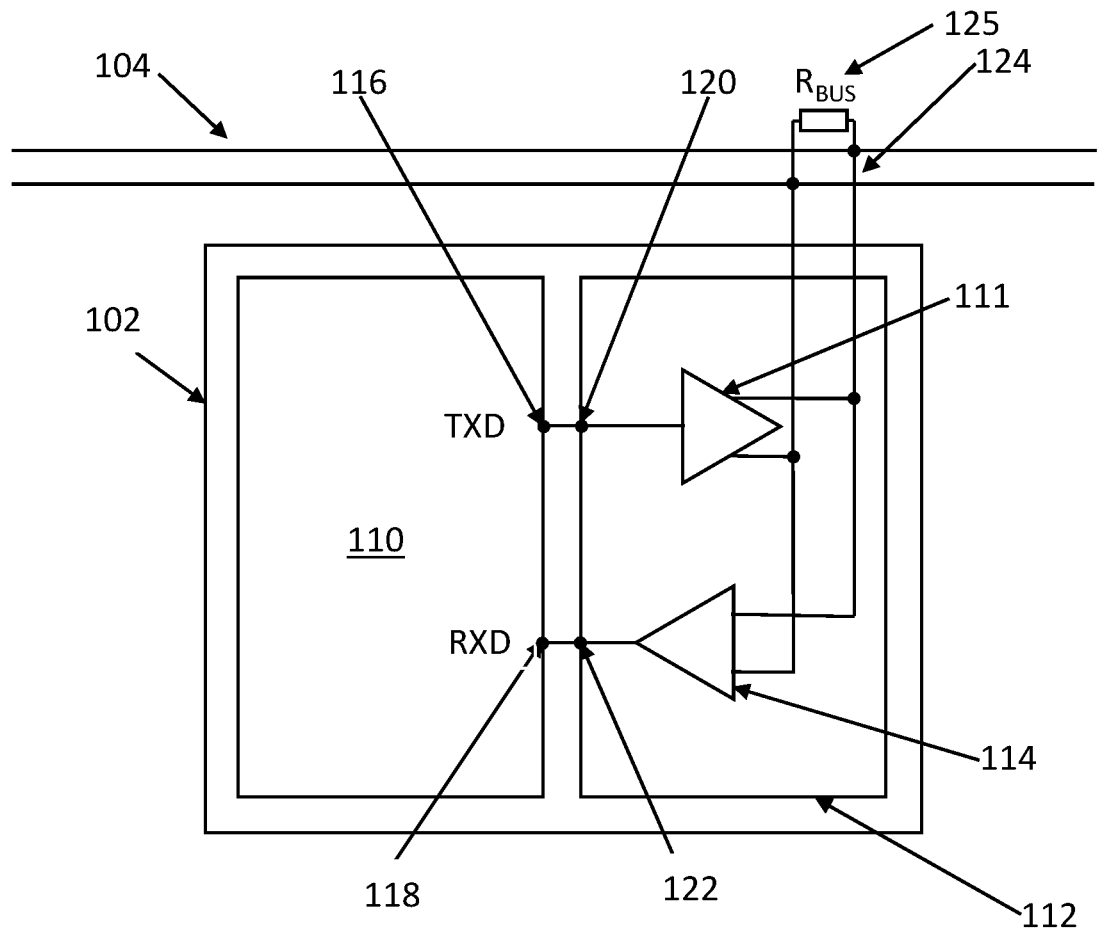

More specifically, critical communication systems or sub-systems, which may include a CAN bus network and node described with respect to FIGS. 1a and 1b, need to ensure redundancy (high availability) to meet the extended requirements of functional safety. This is a relevant cost factor, adding to the overall cost level of the vehicle system. In some aspects, the present disclosure is directed to mitigating loss of functionality following a communications failure of a CAN node whilst providing the required safety infrastructure.

Figure 2:
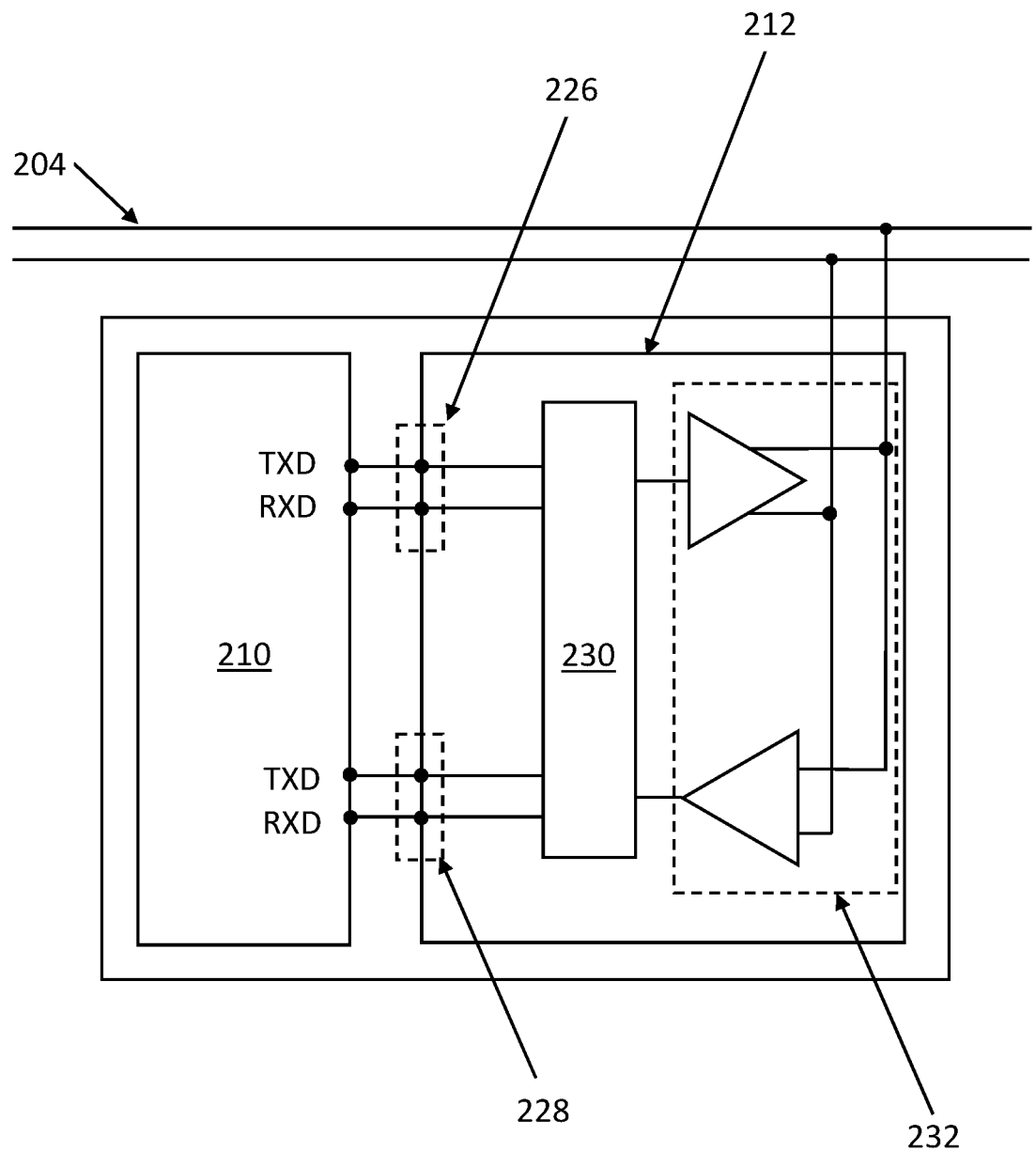
FIG. 2 shows an example schematic block diagram of a transceiver device according to an aspect of the disclosure.

FIG. 2 shows an example schematic block diagram of a transceiver device 212 according to an aspect of the disclosure. The transceiver device 212 is suitable for communicating between one or more network protocol controllers 210 and a network bus 204.

The one or more network protocol controllers may be provided by a single network protocol controller 210 with a plurality of interfaces, as shown in FIG. 2, or alternatively by a plurality of separate network protocol controllers.

The transceiver device 212 comprises first interface circuitry 226, second interface circuitry 228 and selector circuitry 230, and may comprise transceiver circuitry 232 coupled to the first and second interface circuitry 226, 228 and configured to communicate over the network bus 204. The first interface circuitry 226 is configured to communicate with a first interface of the network protocol controller 210, the second interface circuitry 228 is configured to communicate with a second interface of the network protocol controller 210. The selector circuitry 230 is configured to switch communication with the network protocol controller 210 from the first interface circuitry 226 to the second interface circuitry 228 in response to a communication error in data carried on the first interface circuitry 226.

In the alternative example in which the one or more network protocol controllers is provided by a plurality of separate network protocol controllers, the first interface circuitry 226 is configured to communicate with a first of the network protocol controllers and the second interface circuitry is configured to communicate with a second of the network protocol controllers. The selector circuitry is configured to switch communication with the one or more network protocol controllers from the first interface circuitry 226 to the second interface circuitry in response to the communication error in data carried on the first interface circuitry.

In one or more examples, the communication error in data carried on the first interface circuitry 226 corresponds to one or more of an open circuit, a short circuit, an electromagnetic capability, EMC, disturbance (e.g., unwanted EM emissions or radiations), and failure of the first interface circuitry 226. Each of the open circuit and short circuit may one or more of on the network bus 204 (e.g., on a high or low signal line of the network bus) and between the transceiver device 212 and the network bus 204. The short circuit may be with respect to ground or to a supply for the network bus 204 (e.g., a supply for a high or low signal line of the network bus).

The communication error may be detected at the first interface circuitry 226. Whether the communication error is in data carried by, or otherwise on, the first interface circuitry 226, it may be an error at the physical layer level, rather than an error at the communications protocol level.

In some examples, the selector circuitry 230 may be configured to receive an indication that the communication error in data carried on the first interface circuitry 226 has been resolved, receive an indication of a communication error in data carried on the second interface circuitry 228 and switch communication with the one or more network protocol controllers from the second interface circuitry 228 to the first interface circuitry 226 in response to the received indication of the communication error in data carried on the second interface circuitry 228.

In one or more examples, the first interface circuitry 226 and the second interface circuitry 228 may comprise digital circuitry for communicating with the one or more network protocol controllers 210. The first interface circuitry 226 and the second interface circuitry 228 may also be implemented as I/O cells configured to receive/transmit data to one or more network protocol controllers 210 and having dedicated functionality compared to the transceiver circuitry 232 that handles mixed (i.e., analog and digital) signals.

In one or more examples, the network bus 204 may be a single-ended signalling bus, such as a local interconnect network, LIN, bus, or a differential signalling bus, such as a FlexRay bus. Each one of the one or more network protocol controllers 210 may comprise a microcontroller.

The first and second interface circuitry 226, 228 may each comprise a transmit input and a receive output similar to those comprised by the example CAN transceiver shown schematically in FIG. 1b. The transceiver circuitry 232 may also be implemented as a transmitter and receiver as shown schematically in FIG. 1b. The first and second interface circuitry 226, 228 and the transceiver circuitry 232 are, however, not necessarily compliant with a CAN protocol.

That is, in one or more examples the transceiver device 212 may be a controller area network, CAN, transceiver device, the one or more network protocol controllers 210 may be CAN controllers, and the network bus 204 may be a CAN bus, which may operate to the CAN FD protocol, High-Speed CAN, or CAN XL.

Figure 3:
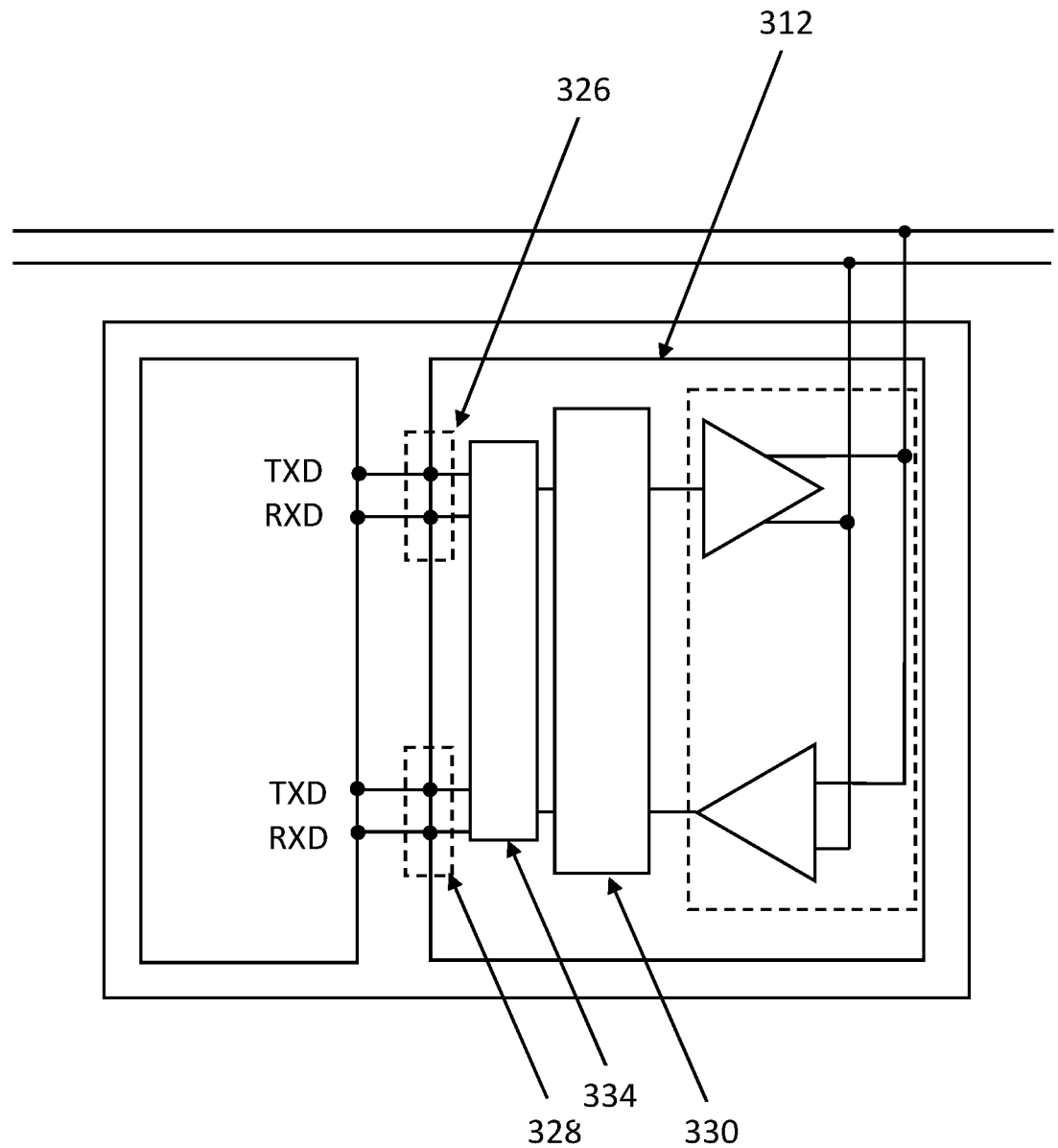
FIG. 3 shows an example schematic block diagram of a transceiver device according to a further aspect of the disclosure.

FIG. 3 shows an example schematic block diagram of a transceiver device 312 according to a further aspect of the disclosure. The transceiver device 312 comprises first interface circuitry 326, second interface circuitry 328, and selector circuitry 330 configured according to the example transceiver device shown schematically in FIG. 2. Furthermore, the transceiver device 312 may comprise one or more of the additional transceiver device features introduced above.

In this example, monitoring circuitry 334 is configured to monitor communication information with one or more network protocol controllers over the first interface circuitry 326 and generate an indication of the communication error in data carried on the first interface circuitry 326 based on the monitored communication information. The monitoring circuitry may be conventional circuitry that is configured to determine error conditions known in the art. In some applications, it is advantageous for the monitoring to be performed by the transceiver, rather than the controller, in order to ensure that a local issue can be detected and addressed by the transceiver.

In one or more examples, generating the indication of the communication error in data carried on the first interface circuitry 326 based on the monitored communication information comprises recording at least one performance parameter representative of the monitored communication information, comparing the at least one performance parameter with one or more communication error entries stored in a look-up table, and generating the indication of the communication error in data carried on the first interface circuitry 326 if the at least one performance parameter matches at least one of the one or more communication error entries stored in the look-up table.

Generating the indication of the communication error in data carried on the first interface circuitry 326 based on the monitored communication information may further comprise recording at least one further performance parameter representative of the monitored communication information, determining a pattern in the recorded performance parameters, and generating the indication of the communication error in data carried on the first interface circuitry if the pattern in the recorded performance parameters matches at least one corresponding pattern in the one or more communication error entries stored in the look-up table.

In one or more examples, the monitoring circuitry 334 is further configured to record at least one performance parameter representative of the monitored communication information, and further comprise diagnostics circuitry (not shown) may be configured to receive the at least one performance parameter from the monitoring circuitry 334, compare the at least one performance parameter with one or more communication error entries stored in a look-up table, and generate the indication of the communication error in data carried on the first interface circuitry 326 if the at least one performance parameter matches at least one of the one or more communication error entries stored in the look-up table. In some examples, the diagnostic and monitoring functionality may be performed by the same functional unit.

In one or more examples, the monitoring circuitry 334 is configured to determine that the communication error in data carried on the first interface circuitry 326 has been resolved, and/or to determine the indication of the communication error in data carried on the second interface circuitry 328. More generally, the monitoring circuitry 334 may be configured to determine the indication of a communication error in data carried on the second interface circuitry 328 as described with respect to a communication error in data carried on the first interface circuitry 326.

In one or more examples, one or more outputs of a state machine may be used as an alternative to, or in combination with, one or more communication error entries stored in a look-up table.

Figure 4:
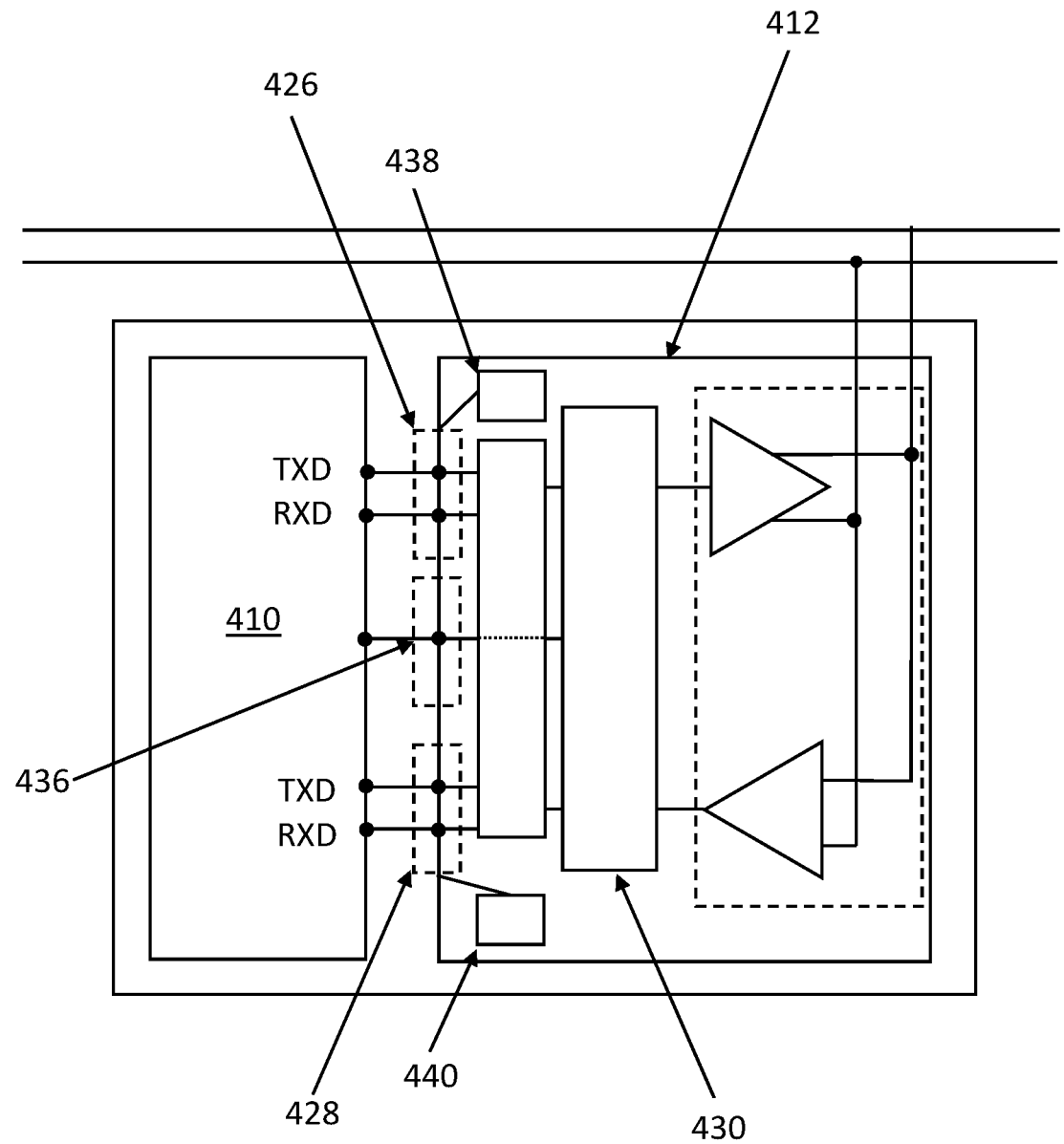
FIG. 4 shows an example schematic block diagram of a transceiver device according to a further aspect of the disclosure.

FIG. 4 shows an example schematic block diagram of a transceiver device 412 according to a further aspect of the disclosure. The transceiver device 412 comprises first interface circuitry 426, second interface circuitry 428, and selector circuitry 430, configured according to the example transceiver devices shown schematically in FIG. 2 or 3.

The transceiver device 412 further comprises third interface circuitry 436, a first power supply 438 for the first interface circuitry 426 and a second power supply 440 for the second interface circuitry 428. The transceiver device 412 may comprise one or more of the additional transceiver device features introduced above.

In one or more examples, the selector circuitry 430 is configured to transmit a switch message to one or more network protocol controllers 410 via the third interface circuitry 436 upon switching communication with the one or more network protocol controllers from the first interface circuitry 426 to the second interface circuitry 428. The switch message may comprise information regarding the indication of the communication error in data carried on the first interface circuitry 426.

In one or more examples, the third interface circuitry 436 may be configured to allow bi-directional communication between the selector circuitry 430 and one or more network protocol controllers. The third interface circuitry 436 may comprise a separate communication link for each of the one or more network protocol controllers.

One or more examples of a transceiver device as set out in the present disclosure may advantageously improve availability within a communication system, an outcome that may be appreciated from the following discussion.

Figure 5:
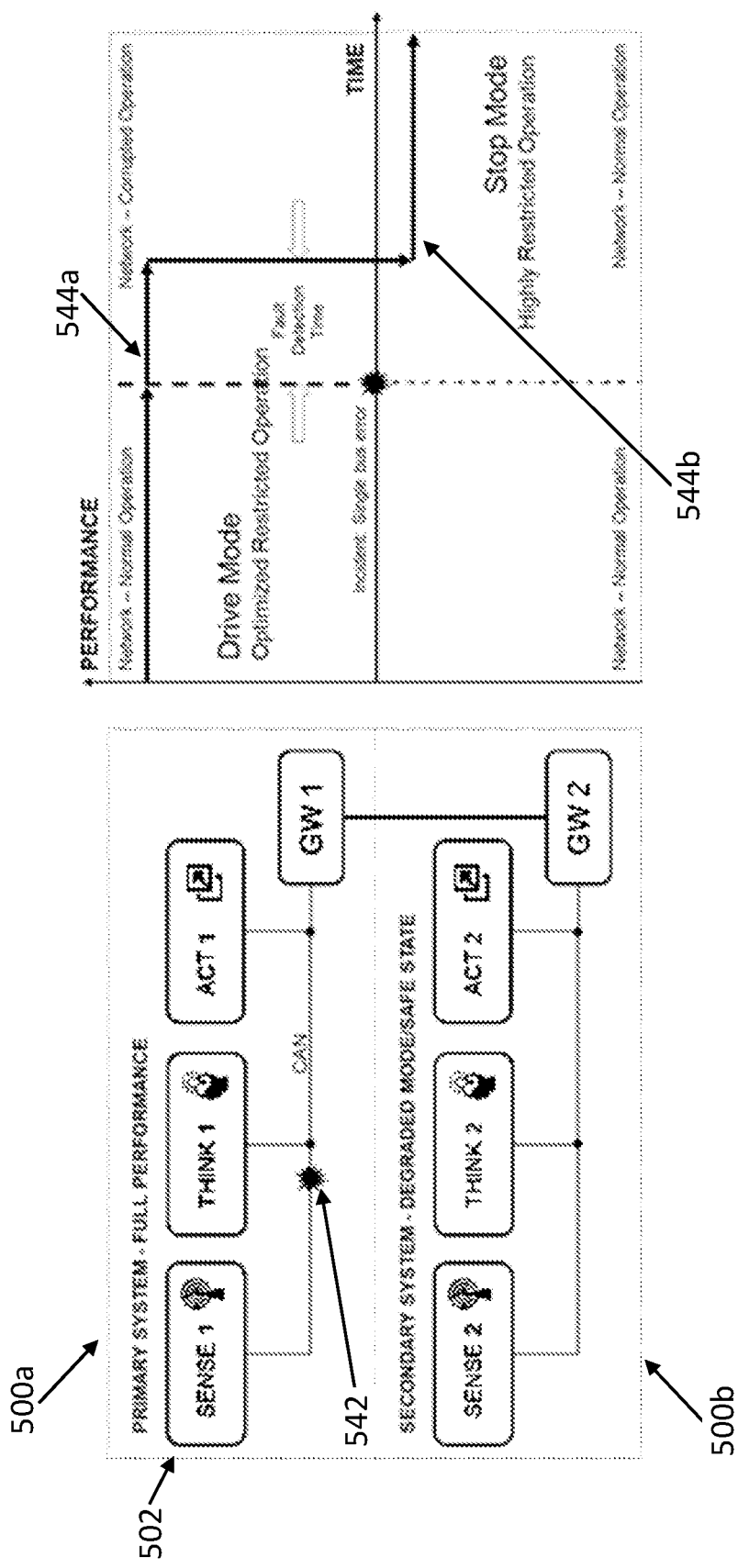
FIG. 5 shows an example schematic scenario of an error in a system.

FIG. 5 shows an example schematic scenario of an error 542 in a system. The system is an in-vehicle system having a primary system and a secondary system. As shown, a primary system 500a configured for full performance, experiences the error 542 obstructing performance. The error may result from a communication error in data carried on transceiver interface circuitry of a transceiver device comprised by a node 502 of the primary system 300a, for example.

As a result of the error 542, performance is subsequently achieved by a redundant secondary system 500b configured for a degraded or safe state mode of operation. As represented by first and second performance traces 544a and 544b, however, the performance of the degraded or safe state mode of operation of the secondary system 500b may be restricted compared to the full performance of the primary system 500a.

Figure 6:
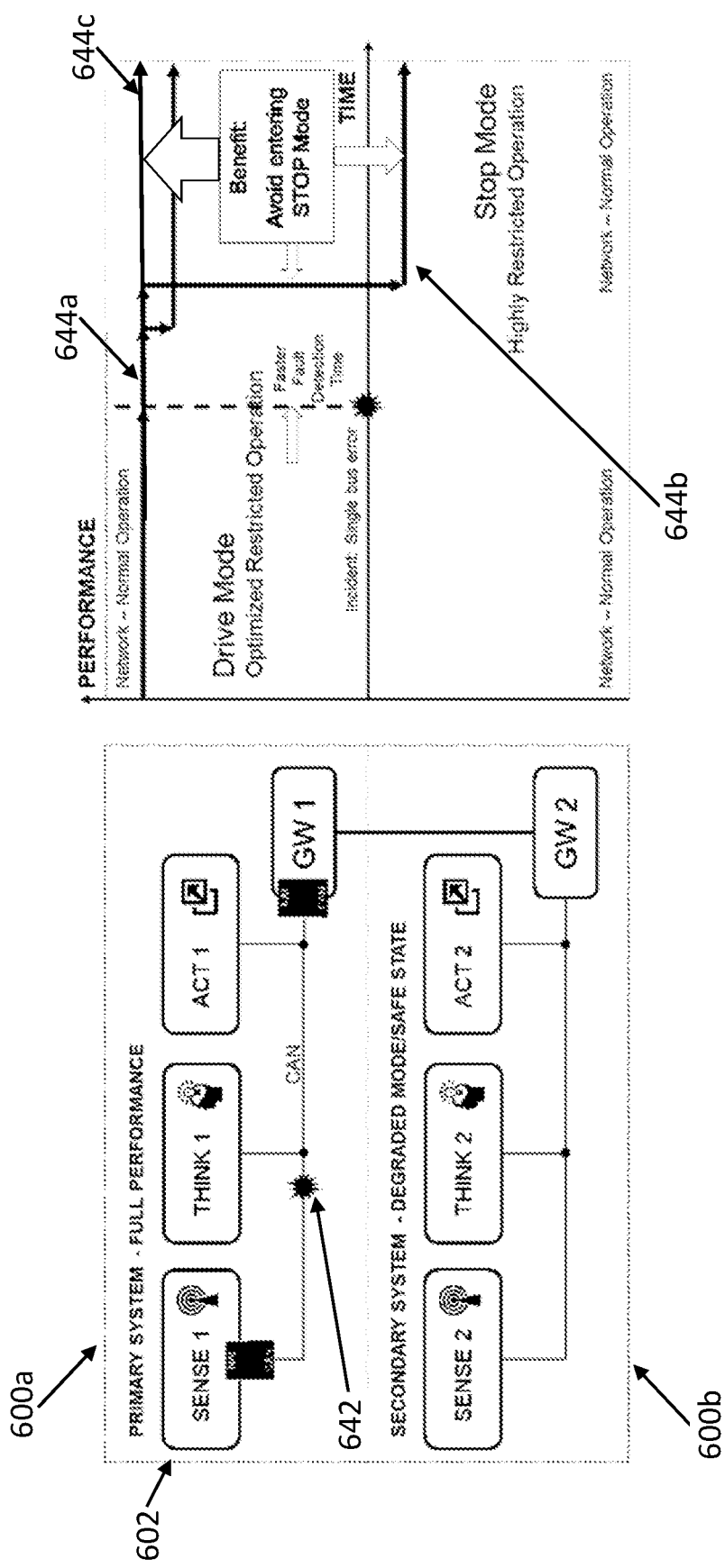
FIG. 6 shows an example schematic scenario of an error in a system.

FIG. 6 shows an example schematic scenario of an error 642 in a system allowing for a different level of operation by implementing nodes in accordance with those described with reference to FIGS. 2 to 4.

As shown, a primary system 600a that is configured for full performance experiences the error 642 that obstructs performance. The error 642 can be considered to result from a communication error in data carried on first interface circuitry of a transceiver device comprised by a node 602 of the primary system 600a.

As a result of the error 642, performance has the potential to be improved by providing a secondary system 600b configured for a degraded or safe state mode of operation. The resultant significant restriction in performance discussed with reference to FIG. 5 is instead mitigated by virtue of switching communication with one or more network protocol controllers from the first interface circuitry to the second interface circuitry in response to the communication error in data carried on the first interface circuitry: compare second and third performance traces 644b and 644c with first performance trace 644a. In this way, reconfiguring a system into an operation mode using a different port and any resultant restriction in performance, is avoided.

In other words, one or more examples of a transceiver device as set out in the present disclosure may circumvent the need for a second system with full or degraded performance that can be physically separated from the primary system. One or more examples of a transceiver device as set out in the present disclosure may also provide a redundant network protocol controller interface, fully independent with respect to power supply, including monitoring capabilities, the ability to switch to second interface circuitry, and the capability to inform a network protocol controller (or communication partners on the network) of the switch. In an autonomous driving context, for example, this avoids moving a vehicle system immediately into a safe state upon a failure in a network protocol controller interface. In such examples, the system may be able to provide exactly the same functions using the second interface and be unaffected by the loss of the first interface, other than for the loss of a fallback system. As such, the system may flag its loss of a safety fall-back to a user via the controller of the effected node, and recommend that the effected node is serviced to restore the primary system, for example.

Furthermore, one or more examples of a transceiver device as set out in the present disclosure may support the ASIL classification and ISO 26262 compliance of a vehicle's communication system or sub-systems that connects, for example, a sensor, sensors, or a sensor field with the AD central computational unit as well as an actuator, actuators, or an actuator field.

Accordingly, one or more examples of a transceiver device as set out in the present disclosure may comprise (and/or realise) one or more of the following:

1. Monitoring to continuously assess the performance of a microcontroller interface, dynamically deliver parameters and characteristics, and/or detect one or more failures (safety phenomena) of the following list, and deliver status information; Unstable signal or higher EMC disturbance; Failure of the primary microcontroller interface; Failure of the secondary microcontroller interface; Missing detailed failure diagnosis.

2. Port Selector to select the microcontroller interface. This function triggers on events signalled by Monitoring or the local host (microcontroller). The frequency of the dynamic update cycle depends on the system function and application (e.g., a vehicle system); Capability to switch between two microcontroller interfaces; Providing all necessary signals to indicate to the microcontroller that port switching has been executed.

3. Transmitter of the transceiver, for communicating over a CAN bus system.

4. Safety Diagnostic stores the latest information about the performance of both microcontroller interfaces, updates relevant data that indicates the state-of-health of the transceiver device during operation, and makes all information accessible, and/or send this information on the CAN, CANFD or any next generation CAN bus system and/or to the local host (microcontroller).

Digital interfaces may also be used for the purpose of communicating to and with a microcontroller on safety-relevant commands and information.

In a non-limiting example: the transceiver device searches via the function Monitoring for pre-defined safety phenomena on the microcontroller interfaces. Safety Diagnostic has a table of failure modes available and uses the input from Monitoring to translate into one or several failure modes. Furthermore, Port Selector can be triggered for switching from primary microcontroller interface to the secondary microcontroller interface and vice-versa. Safety Diagnostic produces the necessary information, commands and responses to communicate with the microcontroller or microcontrollers on safety-relevant aspects.

Figure 7:
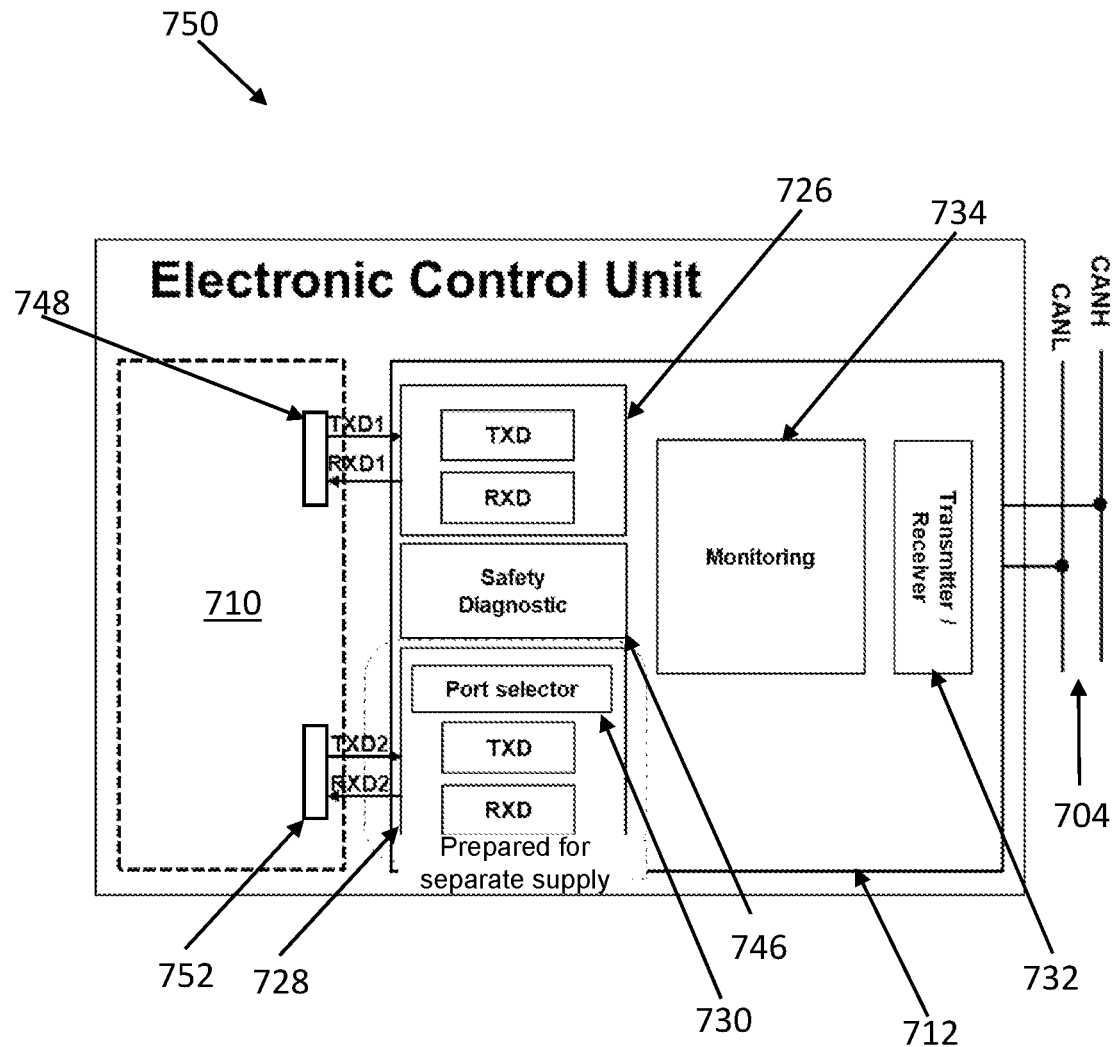
FIG. 7 shows an example schematic block diagram of an electronic control unit, ECU, according to an aspect of the disclosure.

FIG. 7 shows an example schematic block diagram of an electronic control unit, ECU, 750 according to an aspect of the disclosure. The ECU may be coupled to a network bus 704, thereby allowing the ECU 750 to communicate with other ECUs or nodes on the network.

The ECU 750 comprises a transceiver device 712 comprising first interface circuitry 726, second interface circuitry 728, selector circuitry 730, transceiver circuitry 732, monitoring circuitry 734, and diagnostic circuitry 746, configured as described with reference to the example transceiver devices illustrated schematically in FIGS. 2-4.

The ECU 750 further comprises one or more network protocol controllers 710, wherein each of the one or more network protocol controllers 710 comprises first controller interface circuitry 748 coupled to the first interface circuitry 726 of the transceiver device 712, and second controller interface circuitry 752 coupled to the second interface circuitry 728 of the transceiver device 712.

The selector circuitry 730 may be configured to receive an indication of a communication error in data carried on the first controller interface circuitry 748 on at least one of the one or more network protocol controllers 710, and switch communication between the transceiver device 712 and the at least one of the one or more network protocol controllers 710 from the first interface circuitry 726 to the second interface circuitry 728 in response to the determined communication error in data carried on the first controller interface circuitry 748 on the at least one of the one or more network protocol controllers 710. Switching communication in this manner is analogous to switching communication in response to a communication error in data carried on the first interface circuitry of a transceiver device, and as such may also realise one or more of the advantages described previously.

In one or more examples, each of the one or more network protocol controllers 710 comprises a first microcontroller coupled to the first and second controller interface circuitry 748, 752, or a first microcontroller coupled to the first controller interface circuitry 748 and a second microcontroller coupled to the second controller interface circuitry 752.

Figure 8:
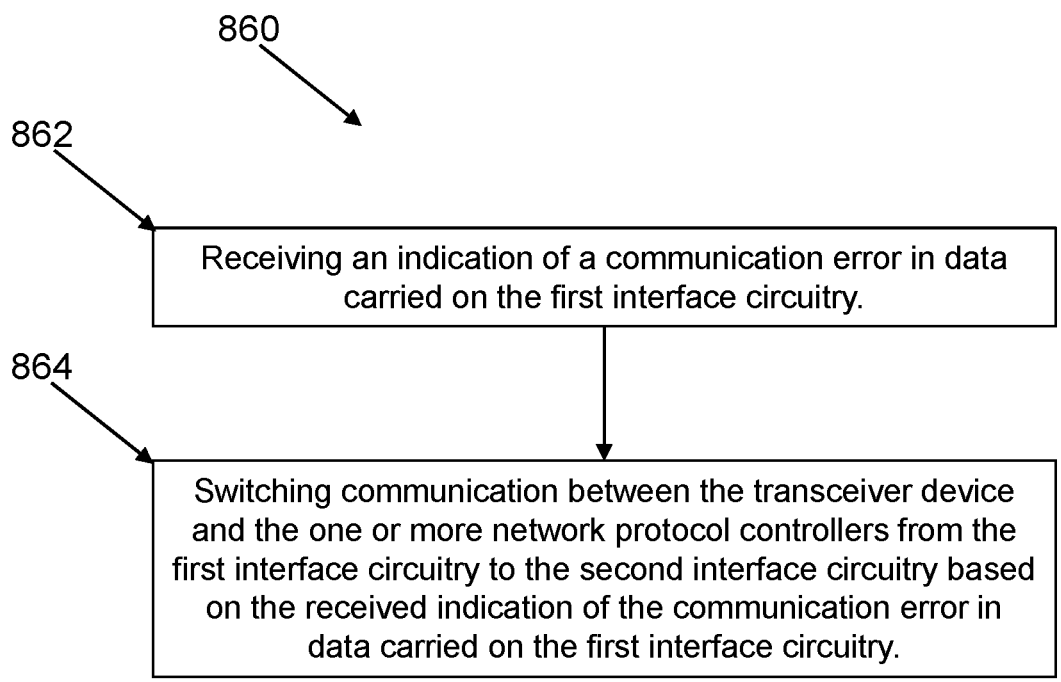
FIG. 8 shows an example method of operating a transceiver device according to an aspect of the disclosure.

FIG. 8 shows an example method 860 of operating a transceiver device according to an aspect of the disclosure. The method 860 comprises receiving 862 an indication of a communication error in data carried on the first interface circuitry and switching 864 communication between the transceiver device and the one or more network protocol controllers from the first interface circuitry to the second interface circuitry based on the received indication of the communication error in data carried on the first interface circuitry.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In one or more example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services.

As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A transceiver device for communicating between one or more network protocol controllers and a network bus, the transceiver device comprising:
   first interface circuitry configured to communicate with the one or more network protocol controllers;
   second interface circuitry configured to communicate with the one or more network protocol controllers; and
   selector circuitry configured to switch communication with the one or more network protocol controllers from the first interface circuitry to the second interface circuitry in response to a communication error in data carried on the first interface circuitry.

2. The transceiver device of claim 1, further comprising monitoring circuitry configured to:
   monitor communication information with the one or more network protocol controllers over the first interface circuitry; and
   generate an indication of the communication error in data carried on the first interface circuitry based on the monitored communication information.

3. The transceiver device of claim 2, wherein generating the indication of the communication error in data carried on the first interface circuitry based on the monitored communication information comprises:
   recording at least one performance parameter representative of the monitored communication information;
   comparing the at least one performance parameter with one or more communication error entries stored in a look-up table; and
   generating the indication of the communication error in data carried on the first interface circuitry if the at least one performance parameter matches at least one of the one or more communication error entries stored in the look-up table.

4. The transceiver device of claim 3, wherein generating the indication of the communication error in data carried on the first interface circuitry based on the monitored communication information further comprises:
   recording at least one further performance parameter representative of the monitored communication information;
   determining a pattern in the recorded performance parameters; and
   generating the indication of the communication error in data carried on the first interface circuitry if the pattern in the recorded performance parameters matches at least one corresponding pattern in the one or more communication error entries stored in the look-up table.

5. The transceiver device of claim 1, further comprising third interface circuitry, wherein the selector circuitry is configured to transmit a switch message to the one or more network protocol controllers via the third interface circuitry upon switching communication with the one or more network protocol controllers from the first interface circuitry to the second interface circuitry.

6. The transceiver device of claim 5, wherein the switch message comprises information regarding the indication of the communication error in data carried on the first interface circuitry.

7. The transceiver device claim 1, wherein the communication error in data carried on the first interface circuitry corresponds to an open circuit; a short circuit; an electromagnetic compatibility (EMC) disturbance; or failure of the first interface circuitry.

8. The transceiver device of claim 1, wherein the selector circuitry is further configured to:
receive an indication that the communication error in data carried on the first interface circuitry has been resolved;
receive an indication of a communication error in data carried on the second interface circuitry; and
switch communication with the one or more network protocol controllers from the second interface circuitry to the first interface circuitry in response to the received indication of the communication error in data carried on the second interface circuitry.

9. The transceiver device of claim 1, wherein the first interface circuitry and the second interface circuitry comprise digital circuitry for communicating with the one or more network protocol controllers.

10. The transceiver device of claim 1, further comprising transceiver circuitry coupled to the first and second interface circuitry, wherein the transceiver circuitry is configured to communicate over the network bus.

11. The transceiver device of claim 1, wherein the transceiver device is a controller area network, CAN, transceiver device, the one or more network protocol controllers are CAN controllers, and the network bus is a CAN bus.

12. The transceiver device of claim 1, further comprising a first power supply for the first interface circuitry and a second power supply for the first interface circuitry.

13. An electronic control unit (ECU) comprising:
the transceiver device of claim 1; and
one or more network protocol controllers,
wherein each of the one or more network protocol controllers comprises:
first controller interface circuitry coupled to the first interface circuitry of the transceiver device, and
second controller interface circuitry coupled to the second interface circuitry of the transceiver device.

14. The ECU of claim 13, wherein the selector circuitry is configured to:
receive an indication of a communication error in data carried on the first controller interface circuitry on at least one of the one or more network protocol controllers; and
switch communication between the transceiver device and the at least one of the one or more network protocol controllers from the first interface circuitry to the second interface circuitry in response to the indication of the communication error in the data carried on the first controller interface circuitry on the at least one of the one or more network protocol controllers.

15. The ECU of claim 13, wherein each of the one or more network protocol controllers comprises a first microcontroller coupled to the first and second controller interface circuitry.

16. The ECU of claim 13, wherein each of the one or more network protocol controllers comprises:
a first microcontroller coupled to the first controller interface circuitry, and
a second microcontroller coupled to the second controller interface circuitry.

17. The ECU of claim 13, wherein the transceiver device further comprises monitoring circuitry configured to:
monitor communication information with the one or more network protocol controllers over the first interface circuitry; and
generate an indication of the communication error in data carried on the first interface circuitry based on the monitored communication information.

18. The ECU of claim 17, wherein generating the indication of the communication error in data carried on the first interface circuitry based on the monitored communication information comprises:
recording at least one performance parameter representative of the monitored communication information;
comparing the at least one performance parameter with one or more communication error entries stored in a look-up table; and
generating the indication of the communication error in data carried on the first interface circuitry if the at least one performance parameter matches at least one of the one or more communication error entries stored in the look-up table.

19. The ECU of claim 18, wherein generating the indication of the communication error in data carried on the first interface circuitry based on the monitored communication information further comprises:
recording at least one further performance parameter representative of the monitored communication information;
determining a pattern in the recorded performance parameters; and
generating the indication of the communication error in data carried on the first interface circuitry if the pattern in the recorded performance parameters matches at least one corresponding pattern in the one or more communication error entries stored in the look-up table.

20. The ECU of claim 13, wherein the transceiver device further comprises third interface circuitry, wherein the selector circuitry is configured to transmit a switch message to the one or more network protocol controllers via the third interface circuitry upon switching communication with the one or more network protocol controllers from the first interface circuitry to the second interface circuitry.

* * * * *